US005773943A

United States Patent [19]

Andersen

[11] Patent Number: 5,773,943

[45] Date of Patent: Jun. 30, 1998

[54] DRIVE DEVICE FOR A REVOLVING DOOR

[75] Inventor: Henrik Andersen, Värlöse, Denmark

[73] Assignee: Dorma GmbH & Co. KG, Ennepetal, Germany

[21] Appl. No.: 638,086

[22] Filed: Apr. 25, 1996

Related U.S. Application Data

[63] Continuation-in-part of PCT/DE95/01015, Aug. 4, 1995.

[30] Foreign Application Priority Data

Aug. 25, 1994 [DE] Germany .......................... 44 29 893.5

[51] Int. Cl.[6] .............................. E05D 15/02; H02P 7/00

[52] U.S. Cl. .............................................. 318/432; 49/43

[58] Field of Search .......................... 49/42, 43; 318/432, 318/1–3, 14, 15, 433, 434, 566

[56] References Cited

U.S. PATENT DOCUMENTS

| | | | |
|---|---|---|---|
| 3,766,686 | 10/1973 | Sheckells | 49/43 |
| 3,897,651 | 8/1975 | Sheckells | 49/43 |
| 4,341,165 | 7/1982 | Calandritti et al. | 49/42 |
| 4,628,496 | 12/1986 | Lee | 367/93 |
| 4,785,580 | 11/1988 | Olesen | 49/44 |
| 5,019,756 | 5/1991 | Schwarz | 318/254 |

FOREIGN PATENT DOCUMENTS

| | | |
|---|---|---|
| 0145747 | 8/1983 | Denmark . |
| 0331770 | 9/1989 | European Pat. Off. . |
| 0431363 | 6/1991 | European Pat. Off. . |
| 8812507 | 12/1988 | Germany . |
| 2052612 | 1/1881 | United Kingdom . |
| 1084708 | 9/1967 | United Kingdom . |
| 8203104 | 9/1982 | WIPO . |
| 9208868 | 5/1992 | WIPO . |

*Primary Examiner*—Brian Sircus

*Attorney, Agent, or Firm*—Nils H. Ljungman and Associates

[57] ABSTRACT

A drive device for a revolving door, in which, when a drive unit is used, all types of installation are possible, e.g., below the floor, above the ceiling, below the ceiling and also above the floor.

4 Claims, 7 Drawing Sheets

DRIVE DEVICE FOR A REVOLVING DOOR

CONTINUING APPLICATION DATA

This application is a Continuation-In-Part Application of International Application No. PCT/DE95/01015, filed on Aug. 4, 1995, which claims priority from Federal Republic of Germany Application No. P 44 29 893.5, filed on Aug. 25, 1994. International Application No. PCT/DE95/01015, was pending as of the filing date of this application and designated the USA as a designated state.

BACKGROUND OF THE INVENTION

1. Field of the Invention

The present invention relates to a drive device for a revolving door in which door panels rotate around a center point, preferably inside fixed barrel walls which are diametrically opposite one another. The door panels are driven by a drive motor, which is generally an electric motor.

2. Background Information

A revolving door of the type described above is disclosed in International Patent Application WO 82/03104. In the central portion of such a revolving door, i.e., in an enclosed interior space, there is a propulsion unit. On a shaft or axle which is located centrally at the point of rotation and which does not extend through the floor, there is a drive wheel which is driven by an electric motor and additional drive wheels.

There are also described additional revolving doors wherein the drive unit is installed above the ceiling and sets the rotating panels installed below it into rotation.

A revolving door of this type is disclosed in Great Britain Patent No. 2,052,612 A. The drive motor with its transmission is thereby installed between the upper load-bearing cross beams, so that its drive wheel is engaged with a ring which is fastened underneath the load-bearing cross beams. The rotating panels are thereby rotationally mounted on the ring between the outer barrel walls.

A device for the electrical propulsion of an entry way is described in German Utility Model 88 12 507.6. Installed on a drive shaft which is mounted firmly on the frame above the revolving panels there is a drive unit which is realized in the form of a three-phase motor and a self-locking worm gearing. The transmission thereby has a very high translation ratio, which means that, when the system is not powered, the entry way is quasi-blocked, i.e., it stands still. On the other hand, when current is passed through the three-phase motor, the door panels can be held stationary with a correspondingly high force to prevent, or deflect, any hazards.

OBJECT OF THE INVENTION

One object of the present invention is the provision of a drive arrangement which makes it possible to use one and the same drive unit economically in many different types of installation situations.

SUMMARY OF THE INVENTION

The invention teaches that this object can be accomplished by means of a drive device which consists of an electric motor with a worm gearing, which drive device is configured so that it forms a flat assembly, i.e., the electric motor is located next to (e.g., at substantially the same horizontal height, that is, within substantially the same horizontal plane) the worm gearing, so that the overall height is very low compared to similar known units. A shaft runs through the worm gearing, and can be connected either by means of a coupling to an existing center column, or to a rotating inner part of a revolving door. The drive shaft can also run directly through the worm gearing and can be connected by means of corresponding force transmission means, for example, by means of a keyed or splined fitting (also sometimes referred to as a feather key or feather fitting).

The use of such a drive unit makes it possible to cover essentially all possible situations in which a revolving door can be installed. For example, the drive unit can be installed in the face band above the ceiling of the revolving door, in which case the drive unit is installed so that the drive shaft of the rotating part with the connected rotating panels extends through the worm gearing, and is positively and non-positively connected to the worm gearing. As a result of this type of installation, the frequently troublesome height of the face band can be significantly reduced, so that the overall revolving door system can be made to appear significantly taller. Likewise, it is possible to install the drive unit in a sub-floor installation underneath the floor, so that the drive shaft of the rotating part is in turn positively and non-positively connected either directly by means of the worm gearing or by means of an interposed coupling.

When an interior space which rotates along with the door is present, and to which the rotating panels are connected, which is the case in particular in large diameter revolving doors, an advertising or exhibition space can be created in this interior space. It is possible, so that a significant volume of the inner space need not be used for the installation of the drive unit, with a simultaneous reduction of the height of the face band, to install the drive unit either below the ceiling or above the floor. With this type of installation, it becomes clear that the drive device in question is one which takes into consideration the conditions encountered in all different types of constructions, and in particular that one and the same drive device can be used in essentially all these situations, without thereby having to give up any space.

On revolving doors with a very large diameter it is also possible to install one of the drive devices in the area close to the floor and one of the drive devices in the area close to the ceiling, either above or below the floor and ceiling, respectively, to thereby generate the torque required for the revolving door. The drive device with its electric motor is preferably controlled by a control unit which is preferably equipped with a microprocessor, which control unit preferably interacts with a frequency converter. Such control units are generally actuated by external sensors which can operate in all sorts of different ways, and inform the revolving door that a person wishes to pass through the door safely.

An additional special feature of the object of the invention is that the cost of manufacturing the revolving door can be reduced because, when the drive unit is installed underneath the floor, the bearing which would otherwise be necessary for the revolving door panel can be omitted, since the drive unit with the worm gearing is capable of absorbing the loads applied by the rotating part.

The worm gearing can also be realized so that it has a plurality of stages, i.e., a first worm gearing can be connected directly to the drive motor, and the output shaft of the first worm gearing can be positively and non-positively connected to an adjacent flat worm gearing. In this manner, without the need for an additional drive means, there can be a direct coupling between the drive unit and the rotating part. It is thereby possible, without requiring any further measures, for the shaft to extend down to the floor plate, and simultaneously to create the positive and non-positive connection with a shaft which runs through the worm gearing.

The drive device claimed by the invention therefore represents an economical alternative to similar previous systems, since essentially all possible types of installations can be realized using one and the same drive unit, whereby simultaneously all the additional advantageous aspects can be utilized, so that, for example, the face band can be significantly lower and/or narrower than in conventional doors, on account of the flat construction of the drive unit. The same drive unit can be used both with and without a center column. With the preferred simultaneous use of a microprocessor-assisted control system, in connection with a frequency converter, the drive arrangement of the present invention thereby represents an economical alternative to previous systems, since it can eliminate the expense involved in maintaining an enormous inventory for different types of installations, as described above.

In one aspect, the invention generally features a revolving door, the revolving door being for installation in a portion of a building having a building floor surface and a building ceiling surface, the revolving door comprising, a rotary door portion comprising a plurality of door panels rotatable about an axis of rotation, and a drive device for driving the rotary door portion, the drive device comprising motor means for supplying a rotary torque, and worm gearing means for receiving the rotary torque from the motor means and for transferring the rotary torque to the rotary door portion to thereby drivingly rotate the rotary door portion about the axis of rotation, the worm gearing means being positioned laterally with respect to the motor means, and the worm gearing means being disposed in substantially the same horizontal plane as the motor means, the revolving door additionally comprising control means for controlling the rotary torque supplied by the motor means, the control means comprising a microprocessor and a frequency converter.

In another aspect, the invention generally features a drive device for a revolving door, the revolving door being for installation in a portion of a building having a building floor surface and a building ceiling surface, the revolving door comprising a rotary door portion comprising a plurality of door panels rotatable about an axis of rotation, the drive device comprising motor means for supplying a rotary torque, and worm gearing means for receiving the rotary torque from the motor means and for transferring the rotary torque to the rotary door portion to thereby drivingly rotate the rotary door portion about the axis of rotation, the worm gearing means being positioned laterally with respect to the motor means, and the worm gearing means being disposed in substantially the same horizontal plane as the motor means, the revolving door additionally comprising control means for controlling the rotary torque supplied by the motor means, the control means comprising a microprocessor and a frequency converter.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below, with reference to particular preferred embodiments which are illustrated in the accompanying drawings, wherein.

DESCRIPTION OF THE PREFERRED EMBODIMENTS

Figure 1:
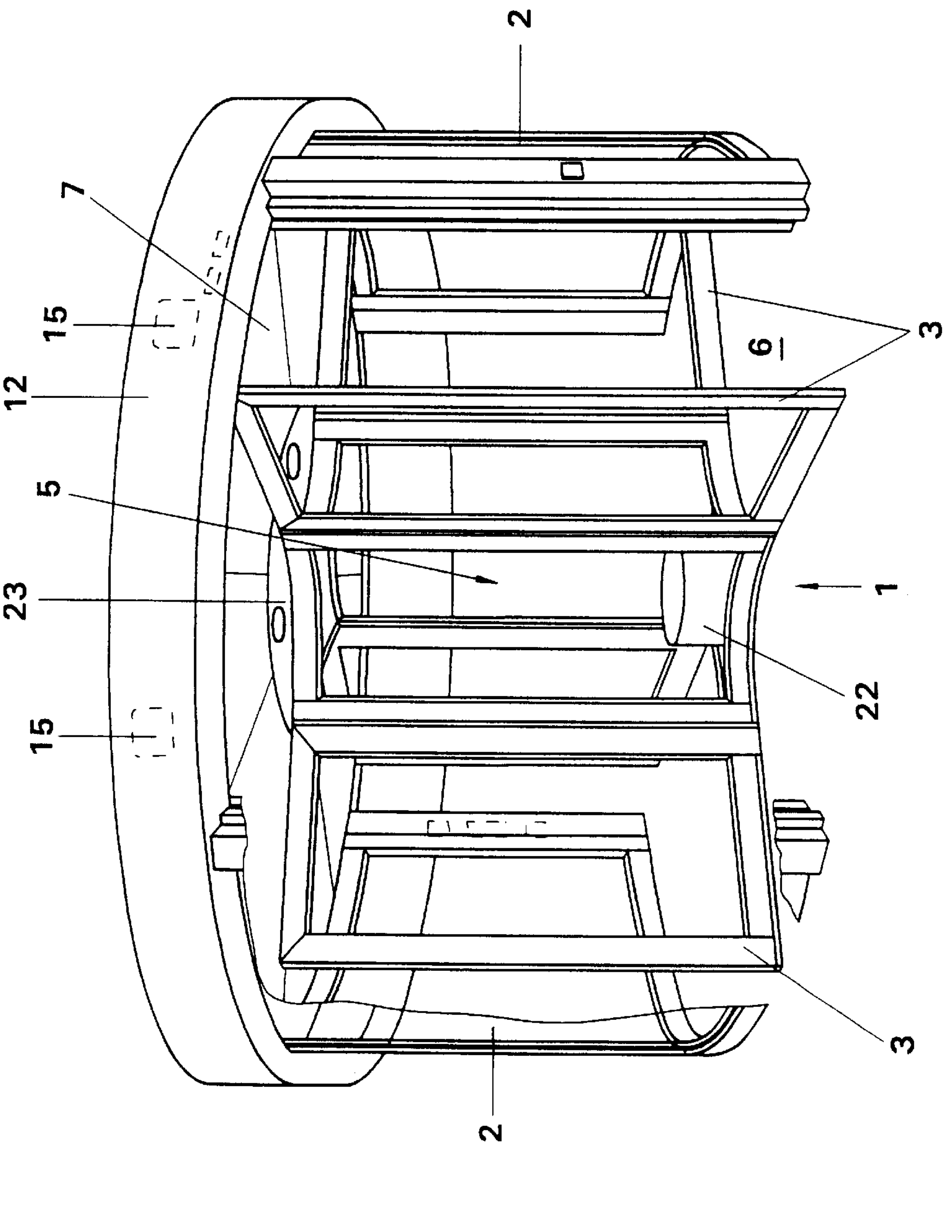
FIG. 1 is a perspective view of a revolving door embodying the invention.
Figure 2:
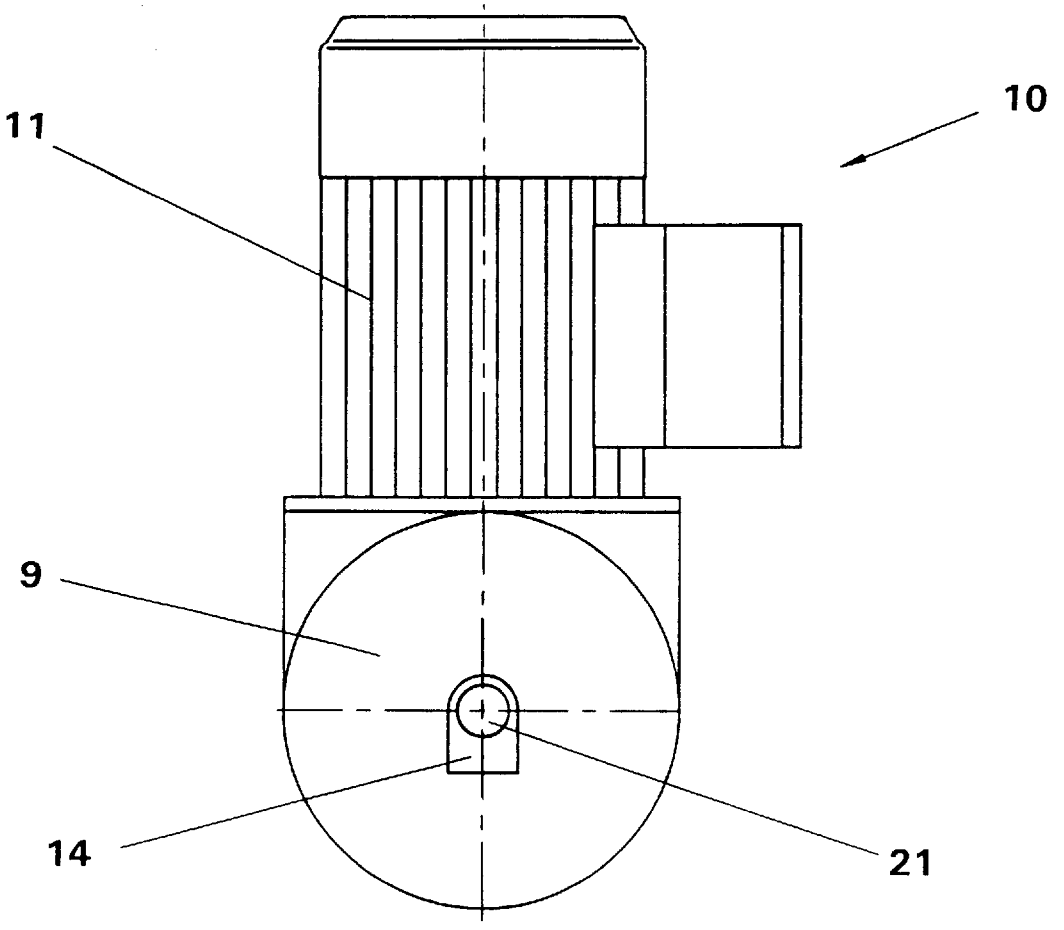
FIG. 2 is a view of a drive unit employed in the revolving door of FIG. 1, viewed from above.

FIG. 1 illustrates a revolving door, the rotating part 1 of which consists of an interior space 5 formed by four curved walls which are provided with glass panes. The rotating panels 3 are attached to each of the corners of this interior space 5. The entire rotating part 1 with the rotating panels 3 and the interior space 5 is driven by an electric motor drive unit which, in the illustrated embodiment, is connected positively and non-positively under a cover 22 with the interior space 5, so that the electric motor drive unit can rotate the entire rotating part. The external frame of the moving parts is preferably formed by the stationary barrel walls 2. In the embodiment of FIG. 1, the upper closure is formed by a revolving door ceiling 7, to which a face band 12 is adjacent, which continues up to the ceiling of the building. The revolving door is preferably controlled by sensors 15 which detect the approach of a person and thus set the rotating part 1 in rotation, thereby making it possible for a person or persons to enter or leave the building.

In the embodiment described above in connection with FIG. 1, an electric motor 11 with its drive unit 10 has been installed under the cover 22. This installation is possible because the revolving door has an interior space 5 and thus the face band 12 can be significantly smaller than if a conventional drive unit were installed inside the face band 12. But it is also possible to install the drive unit 5 in the vicinity of the ceiling 23 inside the interior space 5, in which case it also sets the rotating part 1 in rotation. But the two types of installation described above are only possible if there is a correspondingly large interior space available. If the interior space is not available, the present invention also makes it possible to use other types of installation, namely in the sub-floor or above the ceiling 7 of the revolving door, inside the face band 12, without having to use another type of drive.

If the drive unit 10 is installed inside the face band 12, on account of the design of the drive unit 10, this face band 12 need not be as high as in conventional revolving door systems. On account of the selection of a worm gearing 9 which has been designed so that it is flat, with the connection of an electric motor 11 which sits to the side of the worm gearing 9, that is, at substantially the same vertical height as the worm gearing, a drive unit 10 has been created which has a very low overall height.

An additional transmission (e.g., another worm gearing transmission) can also be installed between the electric motor 11 and the worm gearing 9, to achieve the desired speed of rotation of the door or the required torque for the rotating panels 3. The worm gearing 9 can also be realized so that there is a hole 21 for the installation of an axial drive system, or drive shaft, in which case the force is preferably transmitted between the shaft and the worm gearing by means of a feather (e.g., a keyed or splined fitting, sometimes referred to as a feather key fitting). But it is also possible that the worm gearing 9 can be selected so that it is possible to attach a coupling 14, to which the rotating part 1 can in turn be connected.

Figure 3:
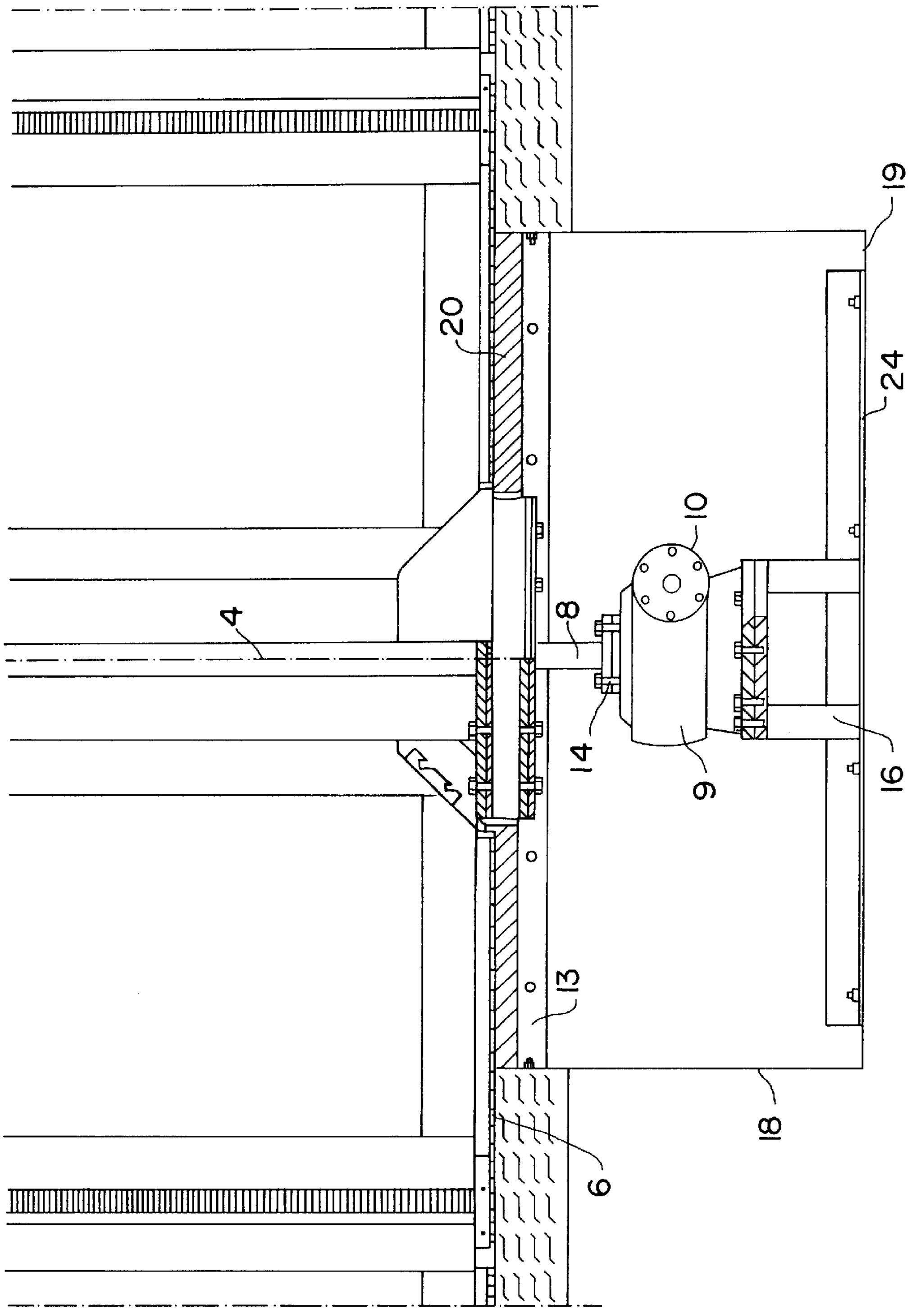
FIG. 3 is an elevational view of a sub-floor installation.

As shown in FIG. 3, the drive unit 10 of the present invention can also be installed below the floor of the building by providing a passage 13 in the floor 6 when the floor 6 is constructed (or, alternatively, by retrofitting such a passage 13 into an existing floor 6), into which a pan or basin, casing or housing 18 is inserted. This pan 18 is preferably enclosed on all sides, to protect the drive unit 10 from disruptive influences. The drive unit 10 with the worm gearing 9 is placed on the bottom 24 of the pan 18, e.g., by means of a frame 16, as illustrated in FIG. 3. In this embodiment, a coupling 14 has been used which is positively and non-positively connected on one hand with the worm gearing 9 and on the other hand with the shaft 8. [As used herein, the term "positively and non-positively connected" indicates that the two structural elements are rotationally coupled to one another so as to provide for the transmission of a rotational torque therebetween. The rotational coupling may be, for example, by means of an interlocking fitting, such as a spline fitting or bolted together flange coupling members, i.e., a positive connection, as shown in FIG. 3, or by means of a non-interlocking but nonetheless effective rotational coupling, such as a frictional force fit between the two structural elements, i.e., a non-positive connection.] The center column 4 can either be connected directly to the shaft 8, or the connection can also be made by means of an additional coupling element. In that case, the individual rotating panels 3 of the revolving door are mounted on the center column 4. In the bottom 24 of the pan 18 there is a water drain 19 to allow any water which may accumulate, e.g., when the floor is being cleaned, to drain out. The passage 13 in the floor 6 is closed by means of a cover 20 which is flush with the floor 6. In this type of installation of the drive unit 10, the floor bearing which is otherwise necessary for conventional revolving doors can be eliminated, since the drive unit 10 is capable, on one hand of absorbing the weight of the rotating part 1, and on the other hand of acting as a support and bearing for it.

If, for example, a client wishes to install a door which has a very large diameter, it is possible to install drive units 10 both in the bottom and top portions of the door, i.e., below and above the ceiling, or below and above the floor 6. This makes it possible to reduce the geometric size of the drive unit 10, and simultaneously provides the necessary torque for the rotating part 1. The drive unit 10 is preferably controlled by a stored program control system which operates with a frequency converter. On account of the direct coupling between the drive unit 10 and the rotating part 1, an improved regulation and control of the revolving door is also possible, since the drive unit 10 requires no belts, chains or other transmission means.

Figure 4:
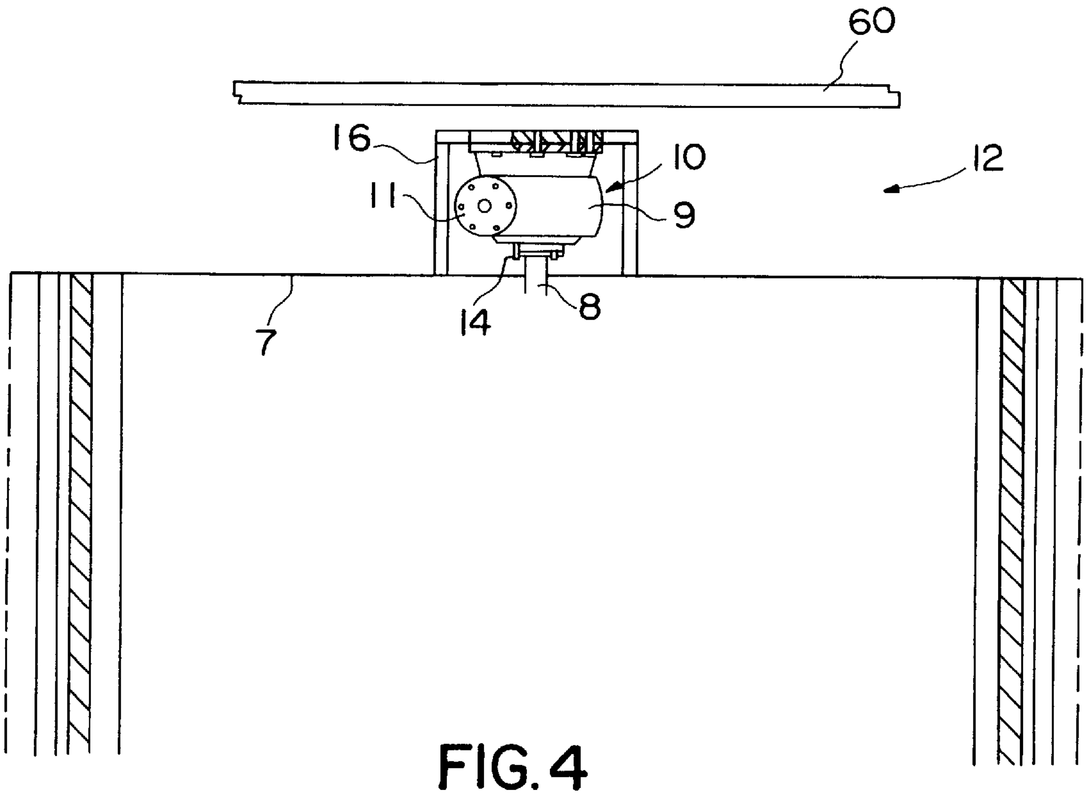
FIG. 4 is an elevational schematic illustration of one embodiment of the invention, wherein the drive unit is installed in the area of a face band of a revolving door, positioned between the ceiling of the revolving door and the ceiling of the building in which the rotational door is installed.

FIG. 4 illustrates an installation of the inventive revolving door in a building having a building ceiling 60. Here, the drive unit 10, which includes the electric motor 11 together with the worm gearing 9, may be mounted on a frame 16 (similar to the frame 16 utilized for a subfloor installation as shown in FIG. 3) which is positioned above the ceiling 7 of the revolving door in the area of the face band 12 of the revolving door (the ceiling 7 and the face band 12 of the revolving door also being shown in FIG. 1). A coupling 14 may be used to couple the output shaft of the worm gearing 9 with a shaft 8 for rotating the rotating part 1 (shown in FIG. 1) of the revolving door.

Figure 5:
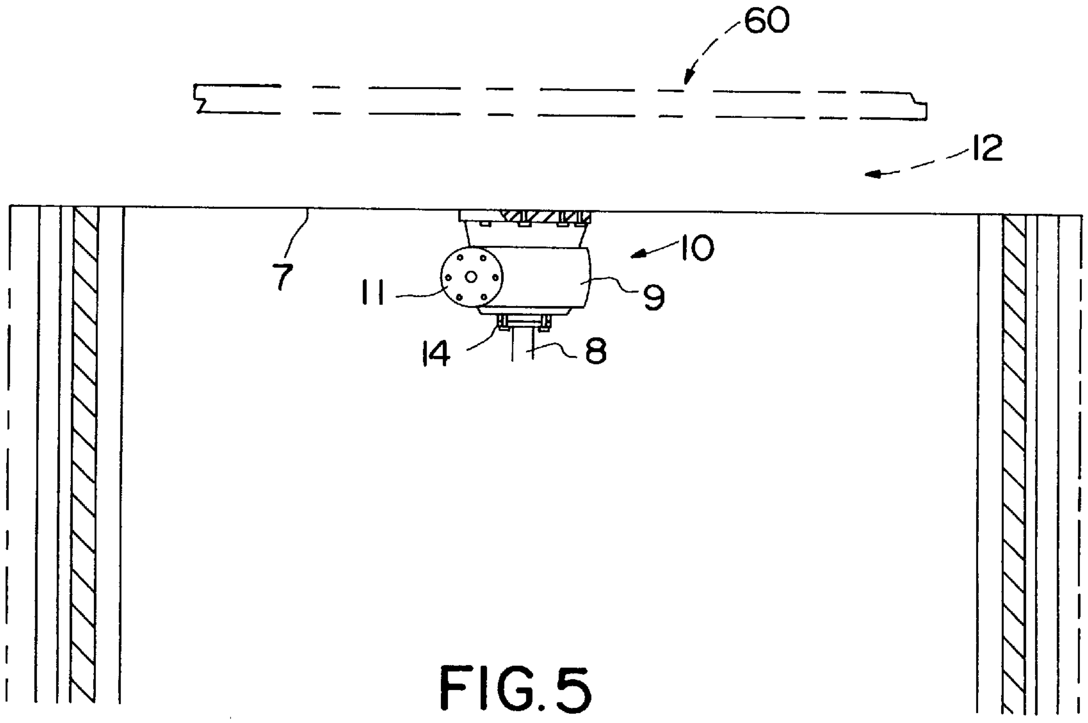
FIG. 5 is an elevational schematic illustration of another embodiment of the invention, wherein the drive unit is installed substantially immediately below the ceiling of a revolving door in a building which may optionally have a building ceiling located above the ceiling of the revolving door and a face band disposed therebetween.

FIG. 5 illustrates an installation of the inventive revolving door wherein the drive unit 10, including the electric motor 11 and the worm gearing 9, is positioned substantially immediately below the ceiling 7 of the revolving door. The ceiling 7 of the revolving door may be optionally positioned beneath the building ceiling 60, and a face band 12 may optionally be provided between the ceiling 7 of the revolving door and the ceiling 60 of the building. Once again, a coupling 14 may be used to rotationally couple the output shaft of the worm gearing 9 to a shaft 8 for rotating the rotating part 1 of the revolving door.

Figure 6:
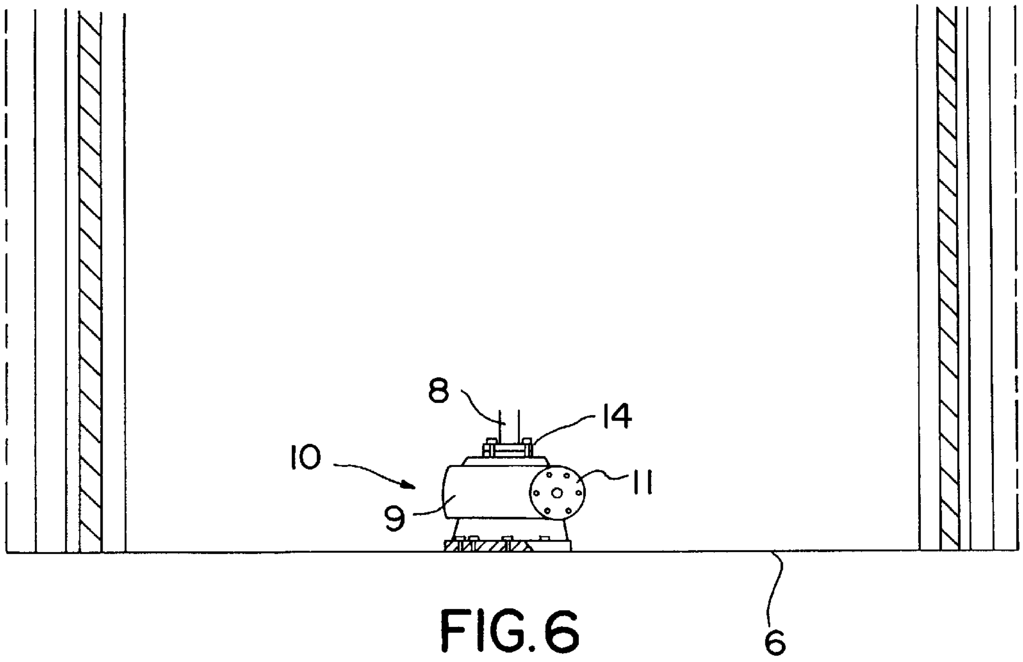
FIG. 6 is an elevational schematic illustration of another embodiment of the invention, wherein the drive unit is installed substantially immediately above the floor of the building in which the revolving door is installed.

In FIG. 6, there is illustrated an installation of the inventive revolving door mounted substantially immediately above a floor 6 of a building. Here again, the drive unit 10 includes the electric motor 11 and the worm gearing 9, and the output shaft of the worm gearing 9 may be rotationally coupled via a coupling 14 with a shaft 8 for rotating the rotating part 1 of the revolving door.

Figure 7:
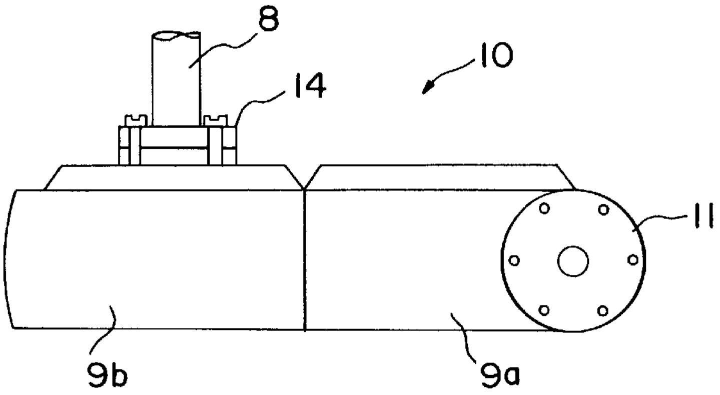
FIG. 7 is a schematic view of one embodiment of the invention, wherein the drive unit includes a drive motor and at least two worm gearing units connected in series to the output of the electric motor.

FIG. 7 shows another embodiment of the drive unit 10 of the inventive revolving door, wherein the electric motor 11 is coupled to two worm gearing units 9*a* and 9*b* which are connected in series to the output of the electric motor 11. The output shaft of the final worm gearing unit 9*b* may be connected via a coupling 14 to a shaft 8 for rotating the rotating part 1 of the revolving door.

Figure 8:
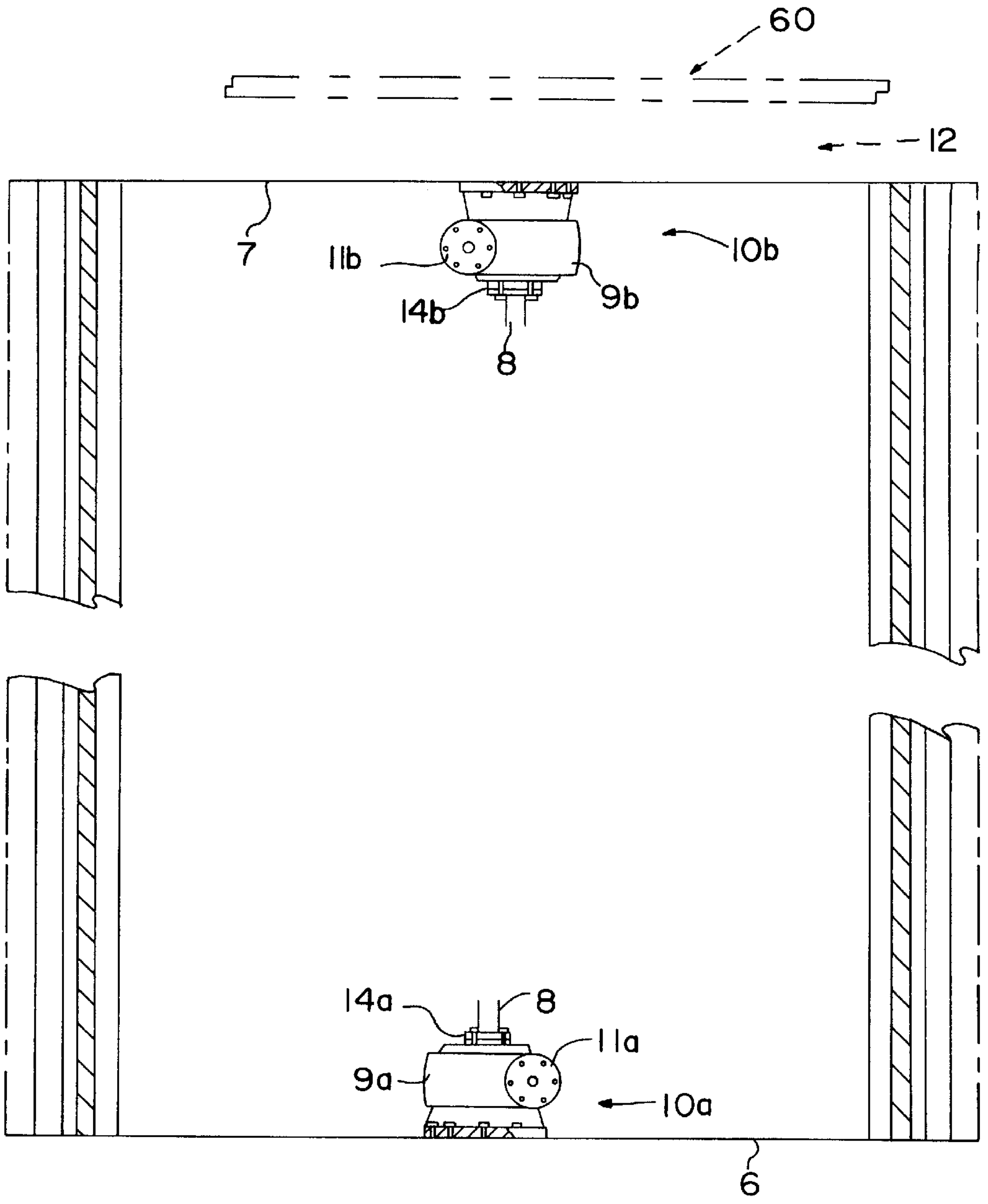
FIG. 8 is an elevational schematic view of yet another embodiment of the invention, wherein two drive units are installed to power a revolving door, a first of the drive units being positioned in the vicinity of the floor, and a second of the drive units being positioned in the vicinity of the ceiling of the revolving door.

FIG. 8 illustrates an embodiment wherein two separate drive units 10*a* and 10*b* are provided for rotating the revolving door, a first of the drive units 10*a*, which includes an electric motor 11*a* and a worm gearing unit 9*a*, being mounted in the vicinity of the floor 6 of the building, and a second of the drive units 10*b*, which includes another electric motor 11*b* and another worm gearing unit 9*b*, being mounted in the vicinity of the ceiling 7 of the revolving door. The output shaft of each of the worm gearing units 9*a* and 9*b* may be rotationally coupled to a shaft 8 for rotating the revolving door via couplings 14*a* and 14*b*, respectively. The installation may optionally also include a face band 12 positioned between the ceiling 7 of the revolving door and the ceiling 60 of the building.

Figure 9:
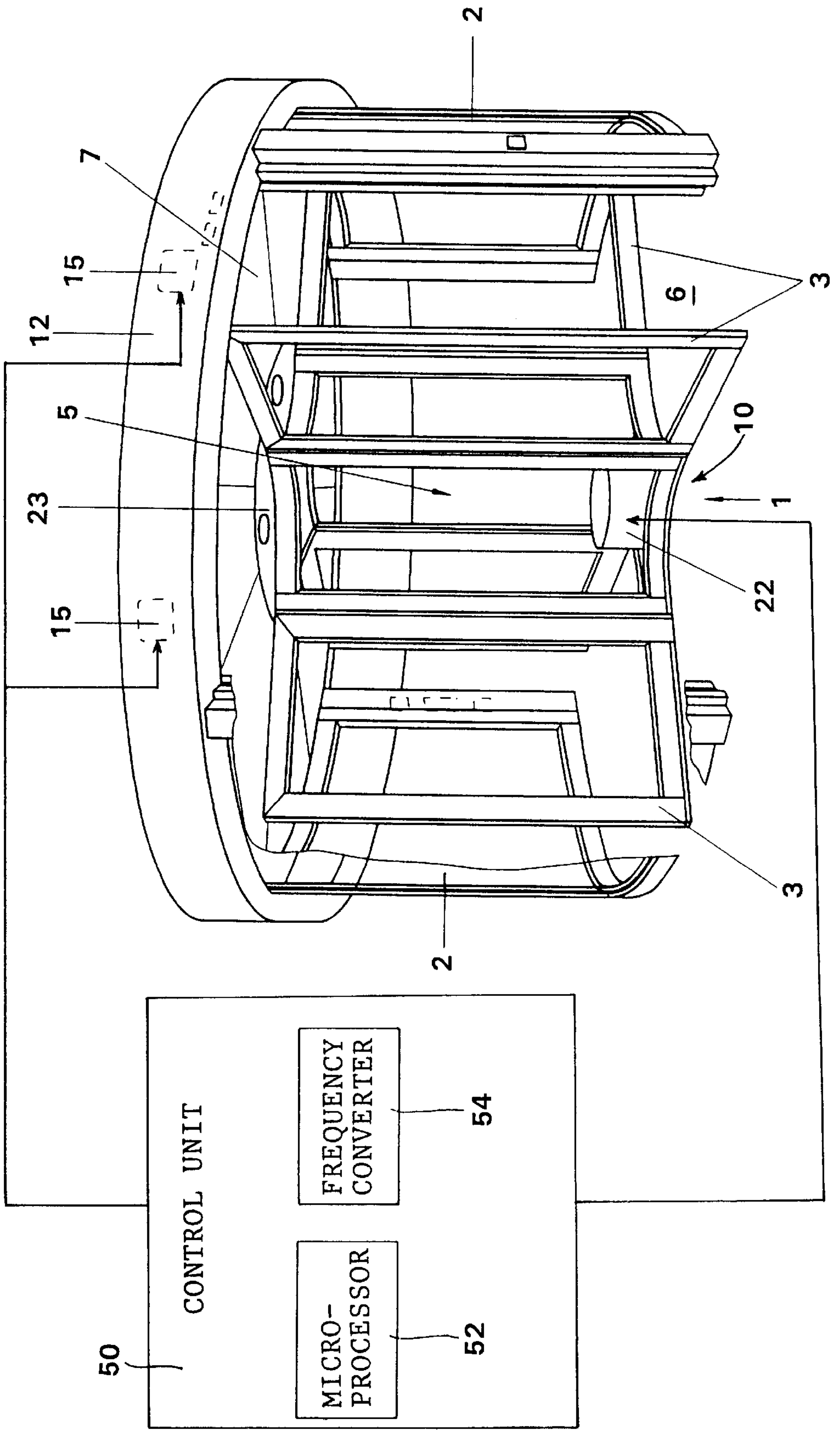
FIG. 9 is an elevational schematic view of the inventive revolving door, similar to FIG. 1, but showing however a control unit employed according to the invention to control the operation of the revolving door, the control unit including a microprocessor and a frequency converter.

FIG. 9 illustrates schematically an embodiment of the invention wherein the operation of the revolving door is controlled by a control unit 50, the control unit 50 preferably including a microprocessor 52 and a frequency converter 54. Here, the control unit 50 is connected to the sensors 15 so as to be able to detect the presence of a person entering or exiting the revolving door, and the control unit 50, through the microprocessor 52 and frequency converter 54 controls the operation (e.g., speed) of the drive unit 10. The controlling of a drive motor (e.g., a brushless DC electric motor) through the use of a frequency converter, also sometimes referred to as a frequency inverter, is well understood in the art, described in patents set forth below and not here further elaborated upon.

One feature of the invention resides broadly in the drive device for a revolving door in which, between two diametrically opposite drum walls, door panels are mounted by means of a center column so that they can rotate around a center point, and are driven by means of a drive motor which is connected to a worm gearing, characterized by the fact that there is an electro-mechanical drive unit 10 which consists of an electric motor 11 with a worm gearing 9 connected on the side, and the drive shaft of the rotating part 1 is connected positively and non-positively directly with the worm gearing 9 so that various types of installation are possible, and to control and regulate the operation of the drive unit there is a control unit which is equipped with a microprocessor and a frequency converter.

Another feature of the invention resides broadly in the drive device characterized by the fact that the drive unit 10 is installed above the ceiling 7 in the face band 12.

Yet another feature of the invention resides broadly in the drive device characterized by the fact that the drive unit 10 is installed below the ceiling 7.

Still another feature of the invention resides broadly in the drive device characterized by the fact that the drive unit 10 is installed below the floor 6.

A further feature of the invention resides broadly in the drive device characterized by the fact that the drive unit 10 is installed above the floor 6.

Another feature of the invention resides broadly in the drive device characterized by the fact that drive units 10 are installed respectively both in the vicinity of the floor and in the vicinity of the ceiling.

Yet another feature of the invention resides broadly in the drive device characterized by the fact that for a sub-floor installation, no additional bearing is used to support the rotating part 1.

Still another feature of the invention resides broadly in the drive device characterized by the fact that a double worm gearing is used, or two worm gearings are used, to which the electric motor 11 is connected laterally.

A further feature of the invention resides broadly in the drive device characterized by the fact that the shaft of the drive unit 10 is connected positively and non-positively to the rotating part 3 by means of a coupling 14.

Frequency converters/inverters which may be used in conjunction with the present invention are disclosed in U.S. Pat. No. 5,019,756, issued to Schwarz on May 28, 1991 and entitled "Process and Electronic Circuit for Controlling a Brushless Direct Current Motor"; U.S. Pat. No. 5,105,141, issued to Ernest on Apr. 14, 1992 and entitled "Device to Control the Speed of Two-Phase or Three-Phase Motors"; U.S. Pat. No. 4,580,082, issued to Guerin-Pinaud on Apr. 1, 1986 and entitled "Method and Devices for Detecting Whether a Direct-Current Motor has Slowed-Down and a Motor Equipped with a Device of this Type"; U.S. Pat. No. 4,603,283, issued to Oltendorf on Jul. 29, 1986 and entitled "Variablespeed Control for a Brushless Direct Current Motor"; U.S. Pat. No. 4,673,849, issued to Sears, et al. on Jun. 16, 1987 and entitled "Permanent Magnet Motor Closed Loop Restarting System"; U.S. Pat. No. 4,678,973, issued to Elliott, et al. on Jul. 7, 1987 and entitled "Sensorless Starting Control for a Brushless DC Motor"; U.S. Pat. No. 4,712,050, issued to Nagasawa, et al. on Dec. 8, 1987 and entitled "Control System for Brushless DC Motor"; U.S. Pat. No. 4,874,993, issued to Tanaka, et al. on Oct. 17, 1989 and entitled "Sensorless Brushless Motor"; U.S. Pat. No. 4,928,043, issued to Plunkett on May 22, 1990 and entitled "Back EMF Sampling Circuit for Phase Locked Loop Motor Control"; U.S. Pat. No. 4,849,871, issued to Wallingford on Jul. 18, 1989 and entitled "Three-Phase PWM Inverter with Speed Control and Load Compensation for an Induction Motor"; U.S. Pat. No. 4,829,551, issued to Resnick, et al. on May 9, 1989 and entitled "Biphase Quadrature Drive for an X-Ray Tube Rotor"; U.S. Pat. No. 4,774,448, issued to Yoshitomi on Sep. 27, 1988 and entitled "Reversible Variable-Speed 2-Phase Electric Motor"; U.S. Pat. No. 4,006,391, issued to Deering, et al. on Feb. 1, 1977 and entitled "Linearized Pulse Width Modulator"; "Static Frequency Converter for Supplying an Asynchronous Two-Phase Motor", IEE Proceedings B. Electrical Power Applications, vol. 134, no. 1, January 1987, Stevenage GB, pages 57–60, D. Alexa; and "Phase-Difference Control of 2-Phase Inverter-Fed Induction Motor", PESC 1989 Record Vol II, Jan. 29, 1989, US, pages 571–578, D. Jang, et al., each of the above-referenced U.S. patents and publications being hereby expressly incorporated by reference herein.

Worm gearing mechanisms which may be used in conjunction with the present invention are to be found in U.S. Pat. No. 5,197,582, issued to Cropley on Mar. 30, 1993 and entitled "Electric Door Opener for Sliding Doors"; U.S. Pat. No. 5,222,402, issued to White, et al. on Jun. 29, 1993 and entitled "Horizontal Seat Position Adjuster"; U.S. Pat. No. 5,267,919, issued to Lin on Dec. 7, 1993 and entitled "Mechanic Drive Apparatus"; and U.S. Pat. No. 5,358,459, issued to Lin on Oct. 25, 1994 and entitled "Mechanic Drive Apparatus", each of the above-referenced U.S. patents being hereby expressly incorporated by reference herein.

Examples of microprocessors being used for the control of door systems, including revolving doors, which control systems may be used in conjunction with the present invention are disclosed in U.S. Pat. No. 5,193,146, issued to Kohno on Mar. 9, 1993 and entitled "Pulse Width Modulation Control System for a Motor"; U.S. Pat. No. 5,257,748, issued to Morizzo on Nov. 2, 1993 and entitled "Sheet Winding Apparatus"; U.S. Pat. No. 5,313,548, issued to Arvidson, et al. on May 17, 1994 and entitled "Direct Current Motor Speed Controller"; U.S. Pat. No. 4,367,810, issued to Doane, et al. on Jan. 11, 1983 and entitled "Elevator Car and Door Motion Interlocks"; U.S. Pat. No. 4,567,411, issued to Reimann, et al. on Jan. 28, 1986 and entitled "High Frequency Pulse Width Modulation"; and U.S. Pat. No. 5,274,312, issued to Gerstenkorn on Dec. 28, 1993 and entitled "Method and Apparatus for Controlling a Sliding Elevator Door", each of the above-referenced U.S. patents being hereby expressly incorporated by reference herein.

Various spline fittings and couplings which may be used in conjunction with the present invention are to be found in U.S. Pat. No. 5,181,570, issued to Allwin, et al. on Jan. 26, 1993 and entitled "Liner Hanger Assembly"; U.S. Pat. No. 5,183,132, issued to Fujisawa on Feb. 2, 1993 and entitled "Power Transfer Device Having Center Differential Gear for Four-Wheel Drive Vehicle"; U.S. Pat. No. 5,186,573, issued to Flotow on Feb. 16, 1993 and entitled "Coupling for Connecting Shafts"; and U.S. Pat. No. 5,269,662, issued to Denton, et al. on Dec. 14, 1993 and entitled "Aircraft Air Conditioner Compressor Drive and Mounting Apparatus", each of the above-referenced U.S. patents being hereby expressly incorporated by reference herein.

A coupling for a revolving door which may be employed in conjunction with the present invention is disclosed in U.S. Pat. No. 5,201,142, issued to Rouwendaal on Apr. 13, 1993 and entitled "Revolving Door", the above-referenced U.S. patent being hereby expressly incorporated by reference herein.

Examples of feather key connections which can be used in conjunction with the present invention are to be found in U.S. Pat. No. 4,938,405, issued to Kunst on Jul. 3, 1990 and entitled "Tractor Drive for an Office Machine"; and U.S. Pat. No. 4,969,372, issued to Muhlecker, et al. on Nov. 13, 1990 and entitled "Arrangement for the Adjustment of Bowden Pull Wires", each of the above-referenced U.S. patents being hereby expressly incorporated by reference herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. P 44 29 893.5, filed on Aug. 25, 1994, and International Application No. PCT/DE95/01015, filed on Aug. 4, 1995, having inventor Henrik Anderson, and DE-OS P 44 29 893.5 and DE-PS P 44 29 893.5 and International Application No. PCT/DE95/01015, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A revolving door, said revolving door being for installation in a portion of a building having a building floor surface and a building ceiling surface, said revolving door comprising:

a rotary door portion comprising a plurality of door panels rotatable about an axis of rotation; and a drive device for driving said rotary door portion, said drive device comprising:

motor means to supply a rotary torque; and worm gearing means to receive said rotary torque from said motor means and to transfer said rotary torque to said rotary door portion to thereby drivingly rotate said rotary door portion about said axis of rotation;

said worm gearing means being positioned laterally with respect to said motor means;

said revolving door additionally comprising:

control means to control the rotary torque supplied by said motor means;

said control means comprising a microprocessor and a frequency converter; and at least two of said drive devices, a first of said at least two drive devices being positioned substantially adjacent to the building floor surface, and a second of said at least two drive devices being positioned substantially adjacent to the revolving door ceiling surface.

2. A revolving door, said revolving door being for installation in a portion of a building having a building floor surface and a building ceiling surface, said revolving door comprising:

a rotary door portion comprising a plurality of door panels rotatable about an axis of rotation; and a drive device for driving said rotary door portion, said drive device comprising:

motor means to supply a rotary torque; and worm gearing means to receive said rotary torque from said motor means and to transfer said rotary torque to said rotary door portion to thereby drivingly rotate said rotary door portion about said axis of rotation;

said worm gearing means being positioned laterally with respect to said motor means;

said revolving door additionally comprising:

control means to control the rotary torque supplied by said motor means;

said control means comprising a microprocessor and a frequency converter; and said worm gearing means comprising at least two worm gearing transmissions, said at least two worm gearing transmissions being connected in series between said motor means and said rotary door portion, and each of said at least two worm gearing transmissions being disposed laterally with respect to and in substantially the same horizontal plane as said motor means.

3. A drive device for a revolving door, said revolving door being for installation in a portion of a building having a building floor surface and a building ceiling surface, said revolving door comprising a rotary door portion comprising a plurality of door panels rotatable about an axis of rotation, said drive device comprising:

motor means to supply a rotary torque; and worm gearing means to receive said rotary torque from said motor means and to transfer said rotary torque to said rotary door portion to thereby drivingly rotate said rotary door portion about said axis of rotation; and said worm gearing means being disposed in substantially the same horizontal plane as said motor means;

said drive device additionally comprising:

control means to control the rotary torque supplied by said motor means;

said control means comprising a microprocessor and a frequency converter; and said drive device additionally comprising at least two of said drive devices, a first of said at least two drive devices being positioned substantially adjacent to the building floor surface, and a second of said at least two drive devices being positioned substantially adjacent to said revolving door ceiling surface.

4. A drive device for a revolving door, said revolving door being for installation in a portion of a building having a building floor surface and a building ceiling surface, said revolving door comprising a rotary door portion comprising a plurality of door panels rotatable about an axis of rotation, said drive device comprising:

motor means to supply a rotary torque; and worm gearing means to receive said rotary torque from said motor means and to transfer said rotary torque to said rotary door portion to thereby drivingly rotate said rotary door portion about said axis of rotation; and said worm gearing means being disposed in substantially the same horizontal plane as said motor means;

said drive device additionally comprising:

control means to control the rotary torque supplied by said motor means;

said control means comprising a microprocessor and a frequency converter; and said worm gearing means comprising at least two worm gearing transmissions, said at least two worm gearing transmissions being connected in series between said motor means and said rotary door portion, and each of said at least two worm gearing transmissions being disposed laterally with respect to and in substantially the same horizontal plane as said motor means.

* * * * *